United States Patent [19]

Cummins

[11] Patent Number: 5,442,736
[45] Date of Patent: Aug. 15, 1995

[54] CORRELATION OF CURSOR POSITION TO SHAPES DISPLAYED ON A VIDEO DISPLAY SCREEN

[75] Inventor: Brian Cummins, Houghton-le-Spring, England

[73] Assignee: International Business Machines Corporation, Armonk, N.Y.

[21] Appl. No.: 50,940

[22] Filed: Apr. 21, 1993

[30] Foreign Application Priority Data

Apr. 21, 1992 [GB] United Kingdom ............ 9215896

[51] Int. Cl.6 ........................................ G06T 15/00
[52] U.S. Cl. .................................. 395/134; 395/133; 395/135; 395/121; 395/122
[58] Field of Search ............... 395/119, 121, 133–135, 395/142, 143, 155, 157, 158, 161, 146, 122; 382/41, 42; 340/747

[56] References Cited

U.S. PATENT DOCUMENTS

| | | | |
|---|---|---|---|
| 4,788,538 | 11/1988 | Klein et al. ................ | 340/747 X |
| 4,847,605 | 7/1989 | Callahan et al. . | |
| 4,982,345 | 1/1991 | Callahan et al. . | |
| 5,027,291 | 6/1991 | Callahan et al. . | |
| 5,101,436 | 3/1992 | DeAguir et al. ........... | 382/41 X |
| 5,329,613 | 7/1994 | Brase et al. ............... | 395/122 |

Primary Examiner—Almis R. Jankus
Attorney, Agent, or Firm—Martin J. McKinley

[57] ABSTRACT

A computer system (10) comprises a processor unit (14), a keyboard (16), a screen (12) and a mouse (18). A user uses the mouse to control the position of a cursor (20) on the screen, and also to indicate a selected cursor position. To correlate this position with shapes (40, 42) on the display, to determine which if any shapes have been selected, the computer first determines whether a pick rectangle around the selected cursor position overlaps a bounding rectangle (40, 42) around a shape. Those shapes for which an overlap is found are redrawn into a bit map in memory, which is then examined to see if this drawing process has resulted in a change to the bit map. Any shapes which produce a change in the bit map must overlap the pick rectangle, and so are correlated with the cursor position.

3 Claims, 2 Drawing Sheets

CORRELATION OF CURSOR POSITION TO SHAPES DISPLAYED ON A VIDEO DISPLAY SCREEN

BACKGROUND OF THE INVENTION

In a conventional computer system, processes are managed by an operating system such as DOS or OS/2, which in turn supports an application program such as a word processor or spreadsheet. The application program is largely responsible for determining what input or output is necessary, but only communicates with the input/output devices via the operating system. Thus, the application program might send a request for a particular output; message to the operating system, which is the responsible for writing the message onto the output display screen.

The actual display on the screen at any one time is determined by the contents of a hardware frame buffer. This buffer usually contains the actual pixel intensities and colors, although there can be another hardware logic processing stage between the frame buffer and the screen itself (for example, the frame buffer may contain text strings which the logic then processes into pixel patterns). Thus, in order to change the display, the operating system updates the frame buffer, and the output on the screen is then altered accordingly. The frame buffer and logic are implemented in hardware because the data rate to the screen is very high; typically on the order of Megabytes per second. This is also the reason that image processing imposes such large computing overheads.

Many modern operating systems provide a graphical user interface (GUI) in which the user can control the position of a cursor on the screen by moving a mouse device. The operating system monitors the physical movement of the mouse and translates this into the corresponding screen position of the cursor. To select a particular point on the screen, the user presses a button on the mouse when the cursor coincides with that point. Again, this user selection of a particular position is first received by the operating system before forwarding to the application program. Typically, the selected position might represent the user's choice of one of several icons or other shapes currently displayed on the screen. These shapes can represent, for example, files to be processed or components of a drawing to be manipulated.

The present invention is concerned with the correlation of a cursor-selected position with the displayed shapes, to determine which shape (or shapes) the user has actually chosen. This correlation is sometimes provided by the operating system, but if not, the application program must do the correlation itself. In either case, the process must be completed in a fraction of a second unless the user is to notice an intrusive delay.

While it is relatively easy for the user to discern which shape is being selected, this is a much more difficult task for the software controlling the computer (whether operating system or application program). It is straightforward enough to obtain the contents of any one screen pixel by interrogating the frame buffer, but this only reveals the current value of the pixel. This will, therefore, not allow a distinction to be made between, for example, two shapes that have the same intensity and color. Furthermore, because of the high data rate involved, it is not possible to separately store screen data, with added information to identify the shapes. Although, in theory, the correlation could be performed by re-calculating the pixels occupied by every shape, (this is, indeed, how the operating system draws the shape in the first place) this is far too expensive in terms of computer processing time and cannot be done quickly enough. Time constraints become even more acute if the user selected position has to be checked against many different shapes displayed simultaneously on the screen.

One way of reducing the amount of computation required is to calculate a bounding rectangle for each shape. The bounding rectangle is defined as the smallest rectangle (with horizontal and vertical edges) that completely encloses a particular shape. The selected position is then correlated, not against the shape itself, but against the bounding rectangle instead. This approach is much simpler computationally and faster, but can produce an incorrect correlation if the selected position is outside a particular shape, but within its associated bounding rectangle.

SUMMARY OF THE INVENTION

The present invention adopts a two-part approach to correlation, using bounding rectangles in a first pass for speed, followed by a second pass to maintain full accuracy, while still minimising overall processing time. The examination of bounding rectangles in the first pass quickly eliminates shapes that are not close to the selected cursor position. The second pass then examines any remaining shapes, to provide an exact determination of correlation. This is achieved by re-drawing the remaining shapes into a specially created bit map in memory. The bit map is defined so as to correspond to a region of predetermined size around the selected cursor position. This select region, which is usually rectangular, is effectively a predefined margin of error that has been attributed to the user's positioning of the cursor. Since the select region, which is typically only a few pixels across, is much smaller than the whole screen, shapes can be rapidly re-drawn; parts of shapes outside the select region being simply ignored. The bit map is small enough to keep in RAM, and so can be accessed quickly to determine which (if any) of the redrawn shapes have written pixels to the map. Any shape that changes pixels in the bit map is considered to be correlated with the user's selected position. It is up to the designer of the calling procedure to decide what action to take if more than one shape (or zero) is found to be correlated. The method of the present invention can be implemented either as part of the computer operating system, or by an application program.

Preferably, the bit map is created with one bit per pixel, as opposed to the several bytes per pixel of the screen image. All areas of a shape, whether partially shaded, or light or dark solid color, are effectively depicted in monochrome at a single intensity (black or zero is convenient). This simplified representation is quite sufficient to determine whether a shape overlaps the select region, is faster to re-draw, and requires far less storage than a bit map with several bytes per pixel.

It is further preferred that the step of determining whether a shape whose bounding rectangle overlaps the select region has been written to the bit map comprises reading the bit map after each shape has been drawn, and examining whether any bits in the map have been changed. Thus, after each shape is drawn into the bit map, the bit map is checked to see if any bits have been altered by drawing that shape. If any have, then that shape must overlap the select region, and so that shape is one that the user may have selected. A list can then be created of correlated shapes.

An alternative approach is if each pixel in the bit map corresponds to three bytes of information (e.g., 255 intensity levels in each of three colors), so that each pixel has 24 bit positions associated with it. Provided that no more than twenty-four shapes are displayed at any particular time, the first shape can be drawn into the first bit position, the second into the second, etc. At the end, the value for each pixel can then be read out and the correlated shapes uniquely determined from the bit positions that have been altered. This approach has the advantage of reading the bit map fewer times, but requires much larger storage space for the bit map and is limited in the number of shapes that it can handle.

Preferably the steps of examining the bounding rectangle, drawing each shape, and examining the bit map are performed in succession for each shape. This allows the correlation procedure to be terminated, for example, as soon as the first shape (corresponding, perhaps, to the uppermost on the screen) to be correlated. A different approach would be to first make a list of those shapes whose bounding rectangle intersects the select region, and then draw the shapes in this list into the bit map. This is less efficient if only a limited number of correlated shapes are to be detected because it calculates bounding rectangle intersections for every shape.

DESCRIPTION OF AN ILLUSTRATIVE EMBODIMENT

Figure 1:
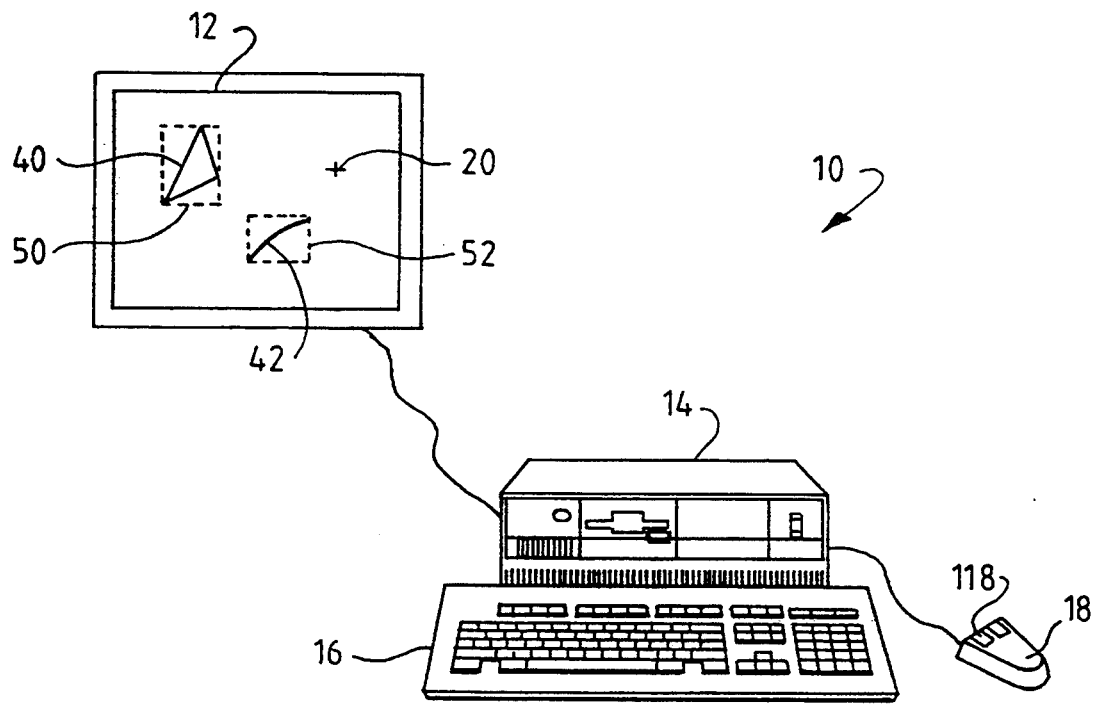
FIG. 1 is a schematic diagram of a typical computer system.
Figure 2:
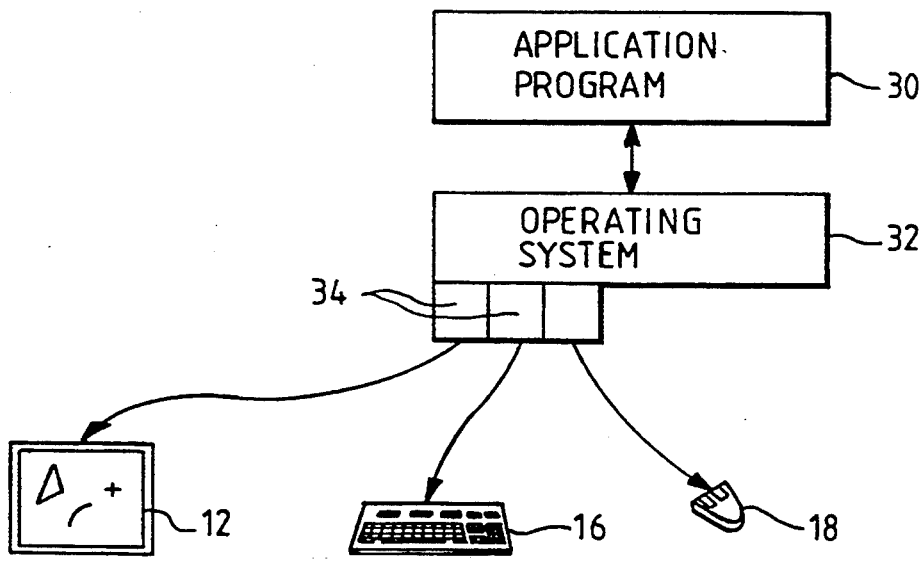
FIG. 2 is a schematic diagram illustrating the interaction between an application program and an operating system.

FIG. 1 illustrates a computer system 10 including a screen 12, processor unit 14, keyboard 16 and mouse 18. With the mouse, the user can change the position of a cursor 20 displayed on the screen. Typically, input from the mouse and output to the screen are handled by BIOS code 34 (see FIG. 2), which can be treated for present purposes as part of the operating system 32. The following description will assume that the correlation of the cursor position is performed by an application program, but it could equally well be implemented as part of the computer operating system.

In order to draw a particular shape 40, 42 on the screen 12, the application program calls an appropriate subroutine of the operating system, and passes to it various parameters specifying the shape to be drawn (size, position, etc). Typically, other subroutines might also be called; for example, to initialize drawing operations. The subroutine calls and associated parameters that are available in the DOS Windows operating system from Microsoft Corporation are described in "The Microsoft Windows Software Development Kit Reference Vols. 1 and 2" (Document Number SY0302a-300-R00-1089). Analogous procedures exist in other programming environments. The operating system then sends appropriate commands to the device drivers to draw the requested shape on the screen. Generally, the application program works in pre-defined x-y coordinates, which the operating system translates into actual pixel positions.

When the application program requests a shape to be drawn on the screen, it also calculates the bounding rectangle for that particular shape. For shapes such as a circle or square, it is very simple to determine the bounding rectangle. For arbitrary polygons, these can be represented as a plurality of lines, and the bounding rectangle for the polygon calculated relatively simply as the smallest rectangle that encloses the bounding rectangle of every line. For curves, the bounding rectangle can either be obtained by a more sophisticated calculation, or by splitting the curve into a series of very short straight line segments and following the procedure for a polygon. Bounding rectangles 50, 52 are shown in FIG. 1 for shapes 40, 42, although normally, of course, the bounding rectangles do not appear on the screen. It can be seen that the area of a bounding rectangle can be considerably more than that of the shape itself (especially if the shape represents a "line").

The application program maintains a table containing an identification of each shape currently displayed on the screen, and also of the associated bounding rectangle. Typically, bounding rectangles are defined in terms of the X-Y coordinates of the bottom-left and top-right corners. A new entry is made in this table for each new shape displayed on the screen, while the entry is deleted if the shape is removed from the screen.

When the user selects a particular position on the screen, normally using a button 118 on the mouse 18, the operating system returns to the application program the current position of the cursor 20 (in x-y coordinates, rather than pixel coordinates). The application then converts this position into a pick rectangle around the cursor. The pick rectangle has horizontal and vertical edges centered on the exact cursor position and defines an area which it is assumed that the user has selected all of—any shape that overlaps any of the pick rectangle is correlated with the selected cursor position. Thus, the pick rectangle effectively gives the user some margin for error in positioning the cursor, which is particularly useful in attempting to select a small or narrow object, such as a line. Often the user can actually control the size of the pick rectangle, and indeed it is possible to use a 1×1 rectangle, in which case the cursor must lie on exactly the same pixel as the shape to be selected.

To perform the pick correlation, the application program then examines each entry in its table of displayed shapes to see if the pick rectangle intersects the bounding rectangle of the shape. The process for determining whether two rectangles overlap is straightforward and well-known to the skilled person. Those shapes which are found to overlap the pick rectangle are then re-drawn. This is done by calling essentially same operating system subroutines as used to draw the shapes on the screen, but this time specifying (i) that the "screen" size is equal to that of the pick rectangle; (ii) that there is only one bit per pixel; and (ii) instead of drawing to the screen, the pixel values are to be written into a file in memory. The re-drawing can be performed very quickly because factors (i) and (ii) above mean that the effective size of the screen is very small. Thus, any portions of a shape outside the pick rectangle (which is typically only 1% of the width of the full screen) are ignored, and the number of bits per pixel is also reduced. Any part of the shape, whether shaded or not, whatever its color, is represented by a bit value of 1.

After the shape has been drawn, the program requests the contents of the bit map back from the operating system (this is, of course, possible because the bit map has been written to memory rather than the screen). The bit map is examined to see if any of the bits have non-zero values. If the bit map contains only zeros, then the shape has not written to any pixels in the pick rectangle, so that particular shape is not correlated with the selected cursor position. In other words, the selected cursor position lies inside the bounding rectangle of that shape, but outside the shape itself. The program can then go on to examine the bounding rectangle for the next displayed shape. If, however, a non-zero value is found (i.e., a bit set to 1), then this indicates that this particular shape has written to the bit map, and so overlaps the pick rectangle. This shape is, therefore, identified as being correlated with the selected cursor position. The bit map must now be reset to zero before the process can continue to search for other correlated shapes (unless, of course, the application program is only interested in the first correlated shape). If more than one shape is found to be correlated with the selected cursor position, it is up to the application program to decide what action to take next. E.g., whether it accepts the multiple shapes, whether it wants the user to reselect, or whether it wants to repeat the above process using a smaller effective pick rectangle to hunt for the correlated shape closest to the actual cursor position.

Figure 3:
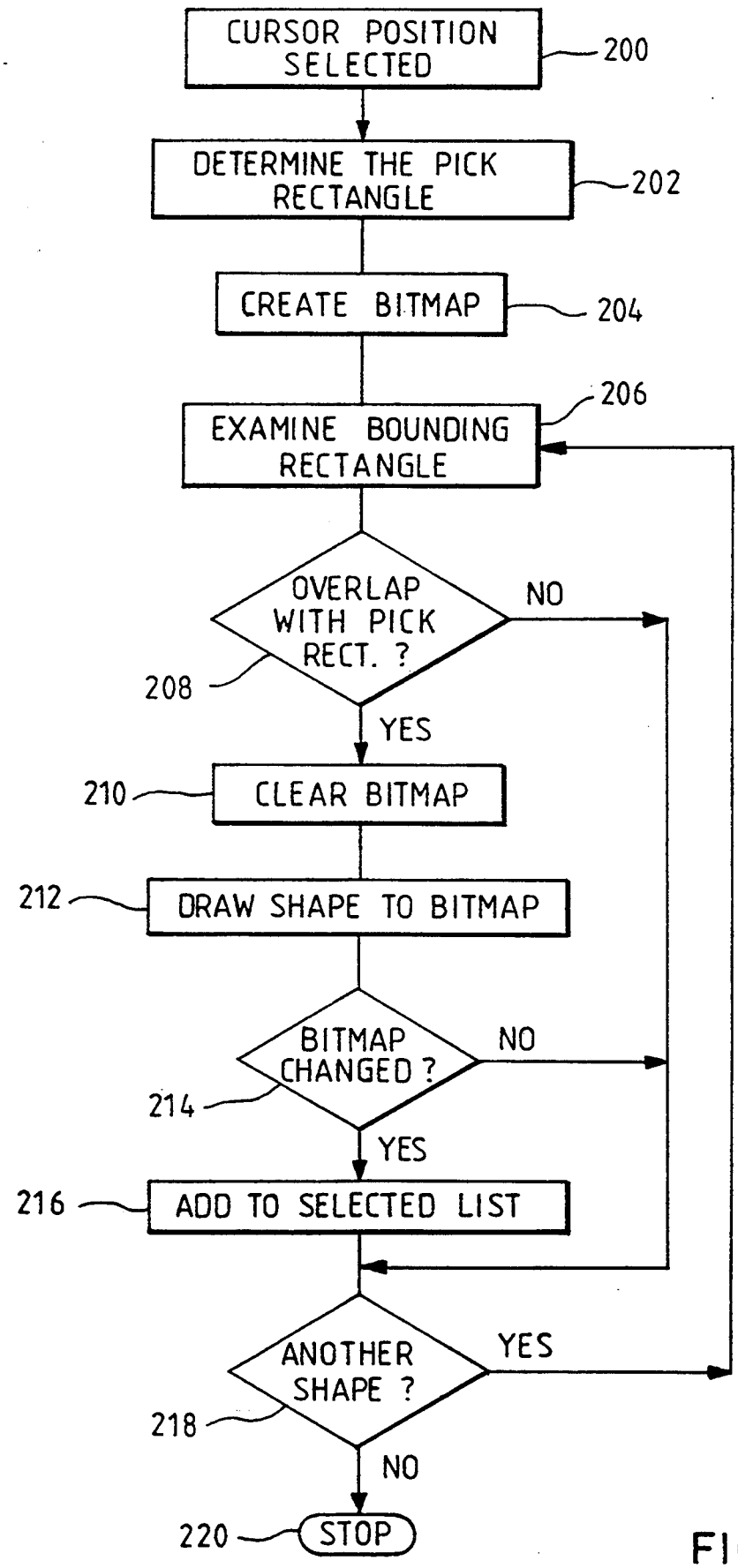
FIG. 3 is a flow chart illustrating a method in accordance with the invention.

The above process is illustrated in the flow chart of FIG. 3, and the corresponding code is listed in Table 1. Table 2 gives a list of the Windows subroutines called, and a brief explanation of what each does. The first two sections of code in Table 1 set up parameters which are under the control of the application program, the size of the pick rectangle, and the maximum acceptable number of "hits" (i.e., shapes that are correlated with the cursor position). Normally the same values for these parameters are used for many correlations, and so their values will be preset before the correlation starts.

The correlation proper begins with receipt of the selected cursor position 200 from the operating system, which allows the pick rectangle to be calculated in a straightforward manner 202. The bit map corresponding in size to the pick rectangle is then created 204 by sections 5–9 of the code of Table 1. Note that the bit map is created at the start of the correlation, and is thereafter available for each shape as required. A slight complication is that in Windows the memory allocated must be a whole number of words (a word is two bytes). The calculation for "bitwidth" in section 5 takes this into account (note that both "bitwidth" and "bitsize" are actually a number of bytes). As a result, the memory allocated may be slightly larger than the pick rectangle.

The bounding rectangle of each displayed shape from the array "bound_rect" in section 11 is examined 206 to see whether it overlaps the pick rectangle 208, starting at the bottom of the array which corresponds to the most recently drawn shapes. If an overlap is found, the bit map is first cleared to zero 210 in case a previous shape has written to it, and then the shape is drawn into the bit map 212 using the function "draw_shape". This function masks off any part of the shape outside the pick rectangle (section 13 to speed up the correlation if the graphics engine of the operating system would otherwise process features outside the bit map before actually drawing the shape.

Once the shape has been drawn, the portion of memory holding the bit map is read out and checked (a byte at a time) to see if any bits have been altered from zero 214. Although the memory allocation for the bit map may be larger than the pick rectangle, the masking process of "draw_shape" ensures that any bits outside the pick rectangle will be zero (alternatively, the loop limits in section 15 could be adjusted appropriately so as to only search those bits actually in the pick rectangle). If any non-zero bits are found (section 16), then this indicates that the shape is correlated with the selected cursor position. This hit is then saved 216 before the next shape is processed 218. The correlation ends 220 when all the displayed shapes have been examined, or when the specified maximum number of hits has been obtained (section 19—this possibility is not shown in FIG. 3). The latter case may occur, for example, when the application program is only interested in the first (i.e., top) shape selected, in which case MAXSEL would be set to 1. At this stage the bit map can be deleted, the memory allocation released, and the application program can decide how to process the correlated shapes (sections 20–23).

TABLE 1

Code for Correlation of Cursor Position
```
/* 1: Set Pick Aperture size */
pickapp.cx = ...
pickapp.cy = ...
/* 2: set the maximum number of hits allowed */
maxsel = ...
/* 3: get the select point in terms of windows pels */
select_point.x = ...
select_point.y = ...
/* 4: set the pick rectangle extents around the select point */
pick_rect.left   = select_point.x − pickapp.cx;
pick_rect.top    = select_point.y − pickapp.cy;
pick_rect.right  = select_Point.x + pickapp.cx;
pick_rect.bottom = select_point.y + pickapp.cy;
/* 5: allocate memory for the bitmap */
bitwidth = (2 * pickapp.cx + 15)/16 * 2;
bitsize = 2 * pickapp.cy * bitwidth;
hmem = GlobalAlloc(GMEM_MOVEABLE | GMEM_DISCARDABLE, (DWORD)bitsize);
bits = GlobalLock(hmem);
/* 6: Create bitmap memory Device Context */
hdcMemory = CreateCompatibleDC((HDC)NULL);
/* 7: generate a monochrome bitmap to do drawing in */
hbitmap = CreateBitmap(2 * pickapp.cx, 2 * pickapp.cy, 1, 1, bits);
holdbitmap = SelectObject(hdcMemory, hbitmap);
/* 8: set the drawing objects for the bitmap */
```

TABLE 1-continued

```
initial_pen = SelectObject(hdcMemory, GetStockObject(WHITE_PEN));
initial_brush = SelectObject(hdcMemory, GetStockObject(WHITE_BRUSH));
initial_font = SelectObject(hdcMemory, GetStockObject(SYSTEM_FONT));
/* 9: set the colour for the bitmap */
SetTextColor(hdcMemory, (COLORREF)0x00FFFFFF);
SetBkColor(hdcMemory, (COLORREF)0x00FFFFFF);
/* 10: loop backward down the list of draw shapes */
for (i = draw_segments; i >= 0; i--)
{
/* 11: see if the bounds array intersects with the pick rectangle
*/
if (IntersectRect(&dummy_rect, &pick_rect, bound_rect[i]))
{
*/12: clear the bitmap to zero */
PatBlt(hdcMemory, 0, 0, 2 * pickapp.cx, 2 * pickapp.cy,
BLACKNESS);
*/ 13: draw the shape into the bitmap */
/* use our own draw_shape function */
draw_shape(hdcMemory, &pick_rect, shape[i]);
/* 14: get the bitmap bits into memory we can address */
GetBitmapBits(hbitmap, (DWORD)bitsize, bits);
/* 15: check the bits in the bitmap to see if any are not zero
*/
bit_on = FALSE;
for (ibit = 0; ibit < bitsize; ibit++)
{
if (bits[ibit] != (char)0)
{
bit_on = TRUE;
break;
}
}
/* 16: check if any bits were on */
if (bit_on == TRUE)
{
/* 17: save away the shape id for later processing */
array[hits] = shape[i];
/* 18: increment hits array index */
hits++;
/* 19: see if we reached the limit of hits required */
if (maxsel-- <= 0)
break;
}
}
}
/* 20: tidy up the gdi objects that we may have created */
SelectObject(hdcMemory, initial_pen);
SelectObject(hdcMemory, initial_brush);
SelectObject(hdcMemory, initial_font);
/* 21: tidy up the bitmap stuff */
SelectObject(hdcMemory, holdbitmap);
DeleteObject(hbitmap);
GlobalUnlock(hmem);
GlobalFree(hmem);
/* 22: delete memory device context */
DeleteDC(hdcMemory);
/* 23: Analyse the result */
if (hits > 0)
{
...
```

TABLE 2
List of Windows Subroutines called

| | |
|---|---|
| GlobalAlloc() | - Allocate memory from the global heap |
| GlobalLock() | - Get pointer to memory block |
| CreateCompatibleDC() | - Create memory device context |
| CreateBitmap() | - Create memory bitmap |
| SelectObject() | - Select object to be used in subsequent GDI drawing |
| SetTextColor() | - Sets the text colour |
| SetBkColor() | - Set the background colour |
| IntersectRect() | - Create the intersection of two rectangles |
| PatBlt() | - Create a bit pattern |
| GetBitmapBits() | - Copies bitmap bits into a buffer |
| GlobalUnlock() | - Unlocks a global memory block |
| GlobalFree() | - Frees a global memory block |
| DeleteDC() | - Delete memory device context |

I claim:

1. A method of correlating a cursor position with displayed shapes in a computer system including storage means, means for displaying the shapes and a cursor, and user input means for moving the cursor and selecting a cursor position, said method comprising the steps of:

displaying one or more shapes on the display means;
determining a bounding rectangle of each displayed shape, and storing information representative of the shape and bounding rectangle;
responsive to a user selecting a cursor position, determining a select region for said cursor position, said select region comprising a rectangle of picture elements surrounding said cursor position;
examining the bounding rectangle of each displayed shape to determine whether it overlaps the select region;

creating a bit map in the storage means corresponding to the select region;

drawing each shape whose bounding rectangle overlaps the select region into the bit map; and examining the bit map to determine whether any shape has been written into the select region of the bit map, and if so correlating that shape with the cursor position selected by the user, wherein said steps of examining the bounding rectangle, drawing each shape, and examining the bit map are performed in succession for each shape.

2. A method of correlating according to claim 1, wherein the select region is rectangular in shape.

3. A method of correlating according to claim 2, wherein the bounding rectangle of irregular curves are determined by treating them as consisting of a multitude of straight-line segments.

* * * * *